United States Patent [19]

Shulman

[11] Patent Number: 5,515,679
[45] Date of Patent: May 14, 1996

[54] GEOTHERMAL HEAT MINING AND UTILIZATION

[75] Inventor: Gary Shulman, Elmira, N.Y.

[73] Assignees: Jerome S. Spevack, New Rochelle, N.Y.; Robert L. Whitelaw, Blacksburg, Va.

[21] Appl. No.: 372,305

[22] Filed: Jan. 13, 1995

[51] Int. Cl.$^6$ ........................................ F03G 4/00
[52] U.S. Cl. .................. 60/641.2; 166/50; 165/45; 165/104.22; 165/104.28
[58] Field of Search ................ 60/641.2; 175/61, 175/62, 45; 166/50, 272, 67; 165/45

[56] References Cited

U.S. PATENT DOCUMENTS

| | | | |
|---|---|---|---|
| 3,857,244 | 12/1974 | Faucette | 60/641.2 |
| 4,047,093 | 9/1977 | Levoy | 60/641.2 |
| 4,054,176 | 10/1977 | Van Huisen | 60/641.2 |
| 4,290,266 | 9/1981 | Twite et al. | 60/641.2 |
| 4,372,398 | 2/1983 | Kuckes | 175/61 |
| 4,538,673 | 9/1985 | Partin et al. | 165/45 |
| 4,712,380 | 12/1987 | Smith | 60/641.2 |
| 4,753,485 | 6/1988 | Goodhart | 175/61 |
| 5,074,365 | 12/1991 | Kuckes | 175/61 |
| 5,311,741 | 5/1994 | Blaize | 60/641.2 |
| 5,361,854 | 11/1994 | Tull et al. | 175/61 |

FOREIGN PATENT DOCUMENTS

| 2420299 | 11/1975 | Germany | 60/641.2 |
|---|---|---|---|

OTHER PUBLICATIONS

J. H. Warren and R. L. Whitelaw, Design of an Insulated Co-Axial Pipe Assembly for a Drilled Geothermal Well, Presented at the AIChE-ASME Heat Transfer Conference, San Francisco, California, Aug. 11–13, 1975, 9 pages (copy appended hereto).

H. Christopher H. Armstead and Jefferson W. Tester, Heat Mining, E. & F. N. Spon, Ltd. 1987, 478 pages, Library of Congress No. 87-5986, ISBN: 0-419-12230-3 (pp. 99-125 appended hereto).

H. J. Herzog, J. W. Tester, Z. Chen, R. M. Potter, and M. G. Frank, Prospects for Universal Heat Mining, Presented at Second EPRI Workshop on Potential of HDR Resources for the U.S. Electric Utility Industry, May 23–24, 1994, 8 pages (copy appended hereto).

*Primary Examiner*—Leonard E. Heyman

[57] ABSTRACT

Method and apparatus for recovering and utilizing thermal energy from subterranean hot rock by means of a self-powered closed system which transfers heat from the hot rock to a relatively cool liquid, e.g. water, flowing in a heat-conducting pipe that extends in a loop descending from the earth's surface to and through the hot rock to a depth, e.g., in the range of 5,000 to 50,000 feet, and connects to the bottom of a heat-insulated riser in which the heated liquid flow ascends to the surface. The heated flow is processed at the surface to utilize recovered thermal energy and is cooled, and the cooled liquid is recycled to the hot rock. A plurality of descending pipe loops are disposed radially a horizontal distance away from said riser and each is connected to the riser. A manifold connecting said pipes at the surface permits rotation of the descending liquid among the pipe loops for continuous operation. The natural temperature of the subterranean hot rock increases with depth causing the temperature of the liquid in the pipes to increase as it descends. The heated flow in the riser ascends to the surface by thermo-siphon circulation which results from the hydraulic head difference between the descending higher density relatively cool liquid flow and the ascending lower density flow of heated liquid and flashed vapor. At the surface, the thermal energy of the heated flow in the riser is recovered and utilized, e.g., by heat exchange and/or by use of flashed vapor in a condensing power cycle, and the cooled liquid flow therefrom is recycled to the manifold and pipes for another heat gathering circuit.

32 Claims, 2 Drawing Sheets

1

GEOTHERMAL HEAT MINING AND UTILIZATION

BACKGROUND OF THE INVENTION

1. Field of the Invention

The natural heat available in the planet Earth represents an enormous energy source which is known as geothermal energy. This heat exists subterraneously at high temperatures as the result of radioactivity decay processes taking place in the earth's mantle and deeper in the molton core of the earth. Volcanic eruptions bring relatively small amounts of that heat source to the surface. Hot springs which result from surface water intrusions into faults and natural fractures in the subterranean hot rock are indicative of a hydrothermal reservoir. Of all the accessable natural energy sources found on earth, by far the largest is geothermal energy and in particular that form which is stored in subterranean hot rock strata of the earth's crust. The term "rock" herein refers to any naturally occurring solid matter, be it igneous, mineral, salt or otherwise, wet or dry. The available energy stored in subterranean hot rock is estimated to be 300 times larger than that obtainable from combustion of all known reserves of fossil energy fuels, i.e., oil, gas and coal.

2. Description of Related Art

Geothermal heat recovery systems employed to date require thermal energy to be removed from hot water and/or steam that is naturally occurring in a subterranean hydrothermal reservoir or aquifer. Such hot water and steam are brought to the surface where the steam is used to drive a turbine and the hot water is flashed to produce steam which in turn is used to drive a turbine and condensed. In instances where the hydrothermal reservoir is not capable of providing sufficient steam for use in a turbine or where the aquifer contains high concentrations of dissolved solids and/or of noncondensable gases, a binary cycle may be advocated whereby the hot fluids from the hydrothermal reservoir are passed through a heat exchanger to transfer its thermal energy to vaporize a secondary liquid, e.g., isobutane or other suitable organic liquid having a boiling point lower than that of water, and the vapor of this secondary liquid is then passed through a turbine, condensed to liquid and recycled in a closed circuit. Hydrothermal waters have also been employed in heat exchanger systems in a variety of space heating and drying operations. Usually, the heat depleted hydrothermal fluids are reinjected into the underground reservoir. In certain instances they are in whole or in part dispersed to the environment. Generally the hydrothermal fluids contain dissolved minerals which cause numerous mechanical and operational problems in the heat recovery equipment. Often, the hydrothermal fluids contain hazardous and noxious substances, and discharging the heat depleted fluids can be detrimental to public heath and safety. In places where mobile underground hot water occurs at relatively shallow depths, submerged downhole heat exchangers have been used to recover relatively low temperature heat for space heating and the like.

To date, efforts to recover thermal energy from subterranean hot rock have been limited to experimental systems based on fracturing the underground rock to create permeability and injecting water into the fracture zone to form an artificial hydrothermal reservoir that acquires heat by conduction from the surrounding hot rock. In such a system, a flow of cold water from the surface is injected into one side of the fracture zone and a flow of heated water is withdrawn from the opposite side of the fracture zone and brought to the surface. The thermal energy available in the heated water returned from the artificial hydrothermal reservoir is recovered by procedures similar to those employed with the natural hydrothermal reservoirs aforesaid and the so cooled water is reinjected into the fracture zone. In such systems, the water in the artificial reservoir can dissolve or otherwise transport mineral s that are present in the rocks and cause mechanical and operational problems similar to those experienced with natural hydrothermal heat recovery systems.

A conceptual design for recovering heat from hot rock had been reported which would remove heat from hot rock at a depth of 50,000 feet (approximately 10 miles) by the circulation of water in a closed liquid phase system consisting of a single pipe well in which is suspended an insulated coaxial smaller diameter pipe. A circulation of cold water from the surface passes down the outer annulus, acquires heat transferred by conduction from the surrounding hot rock and is returned from the bottom to the surface through the inner coaxial pipe. The thermal energy available in the returned hot water is recovered by heat exchange to an external circulation. (J. H. Warren and R. L. Whitelaw, Design of an Insulated Coaxial Pipe Assembly for a Drilled Geothermal Well, AIChE-ASME Heat Transfer Conference, San Francisco, Calif., Aug. 11–13, 1975). The report acknowledges that this concept presents a number of engineering and design problems such as heat recovery inefficiency because of the close proximity of hot and cold fluids in coaxial counterflow, mechanical difficulties because of the differential in thermal expansion between the liners of the coaxial pipe assembly, construction and operational problems due to the considerable hydrostatic pressures developed at the 50,000 feet depth of the well, and the questionable feasibility of insulating, supporting and installing the long coaxial pipe assembly.

The increase of temperature with depth in the earth's crust is known as the geothermal gradient. 30 degrees Celsius per kilometer of depth ("°C./km.") is considered to be the average for all surface locations and 90° C./km is considered to be a moderately high geothermal gradient known to exist at many surface locations where subterranean depths of about 20,000 feet can be reached with present day drilling techniques. Areas of vulcanism or magmatic intrusion can provide anomalies with higher geothermal gradients.

SUMMARY OF THE INVENTION

This invention relates to novel methods and apparatus employing liquid circulation in a closed pipe loop system by which the thermal energy in subterranean hot rock is extracted, i.e. mined, and brought to the surface for utilization. Said hot rock may be solid, fissured or fractured and dry or wet but essentially free of mobile fluid. By this invention, the thermal energy is transferred from the hot rock to relatively cold liquid flowing in one or more of a plurality of distantly separated heat conducting pipe loops that descend from a manifold at the surface into the hot rock and then join together with the bottom of a riser through which the heated fluid returns to the surface. Maximum heat delivery is attained there the riser presents minimal heat loss by conduction to the surrounding rock it traverses. Each of said pipe loops is valved from the manifold to permit rotation by cycling of liquid flow between them. The closed circulation comprises conduits and means for utilizing the thermal energy delivered to the surface by the hot fluids in the riser. A thermal-syphon or convection circulation created by the hydraulic head difference between the higher density colder down-flow in the pipe loops and the lower density hotter up-flow in the riser can provide for continuous flow from the manifold to the heat utilization means without auxiliary pumping. A throttle device controls the discharge pressure from the riser.

A major advantage of employing this invention for recovering geothermal energy from hot rock and utilizing it for power generation and other purposes is the complete absence of environmental pollution and emission of "greenhouse" gases. Once installed, such an electric power plant would operate continuously and automatically, and with as little manpower as a modern hydro-electric power plant. Unlike any other source of electricity in use today, it could be located most anywhere, independent of weather, terrain, fuel transportation, and major transmission networks, and would produce power at a constant cost without escalation due to future supply and demand for fuel.

This invention was reported in a paper delivered by the inventor, Gary Shulman, entitled "Geothermal Heat Mining by Controlled Natural Convection Water Flow in Hot Dry Rock for Electric Power Generation" at the AIAA 29th Intersociety Energy Conversion Engineering Conference, Monterey, Calif., Aug. 8–12, 1994, and said paper is incorporated hereat by reference.

It is an object of this invention to provide a method and apparatus for extracting thermal energy from subterranean hot rock by circulating a liquid from the earth's surface through the hot rock in a closed circuit employing a plurality of pipe loops in which the liquid can descend and gather heat energy by conduction from the hot rock and then ascend to the surface in a riser for utilization of the recovered thermal energy.

It is a further object of this invention to provide a method and apparatus for recovering thermal energy from subterranean hot rock by transfer to a closed liquid circulation system operating with a thermo-syphon wherein cool liquid descends from the surface to the hot rock in one or more pipe loops, gathers heat from the hot rock and returns to the surface in a riser without need for auxiliary pumping power.

It is a further object of this invention to provide a method and apparatus for recovering thermal energy from subterranean hot rock with a closed liquid circulation system that does not pollute the environment with noxious and/or hazardous discharges and does not add "greenhouse" gases to the atmosphere.

It is a further object of this invention to provide a method and apparatus for recovering and utilizing thermal energy from subterranean hot rock with a closed liquid circulation system that produces heating and/or electric power continuously without need for an external fuel supply.

It is a further object of this invention to provide a method and apparatus for recovering thermal energy from subterranean hot rock with a closed liquid circulation system that transfers such energy by heat exchange for utilization, e.g., for space heating, process heat, steam generation or the like.

It is a further object of this invention to provide a method and apparatus for gathering and utilizing the thermal energy contained in subterranean hot rock that is located between 5,000 and 50,000 feet or more below the earth's surface employing a closed liquid circulation.

It is a further object of this invention to provide a method and apparatus for gathering heat from subterranean hot rock which has a temperature in the range of 300° C. to 1000° C. employing a closed liquid circulation.

It is a further object of this invention to provide a method and apparatus that employs water as the liquid in a closed circulation which gathers heat from subterranean hot rock.

It is a further object of this invention to include soluble additives in the water employed in a closed circulation system which gathers heat from hot rock to inhibit corrosion of the apparatus and/or to enhance heat conductivity from the hot rock and/or to enhance the thermo-syphon action therein.

It is a further object of this invention to employ in the closed liquid circulating system an inorganic or organic fluid of the class having a boiling point lower than that of water and which is thermally and chemically stable at the operating conditions of the system, e.g., ammonia, aqueous ammonia, isobutane, isopentane, fluorocarbon refrigerants, e.g., Freon, and the like, to gather and utilize heat from hot rock whose temperature is in the range of 100° C. to 400° C.

It is a further object of the invention to employ in the closed liquid circulation system a liquid having a boiling point higher than that of water and which is chemically stable at the operating conditions, e.g., from the class of fluids conventionally known as heat transfer fluids such as those having the tradenames Dowtherm, Therminol, Syltherm, and Ucartherm.

DESCRIPTION OF THE PREFERRED EMBODIMENTS

Figure 1:
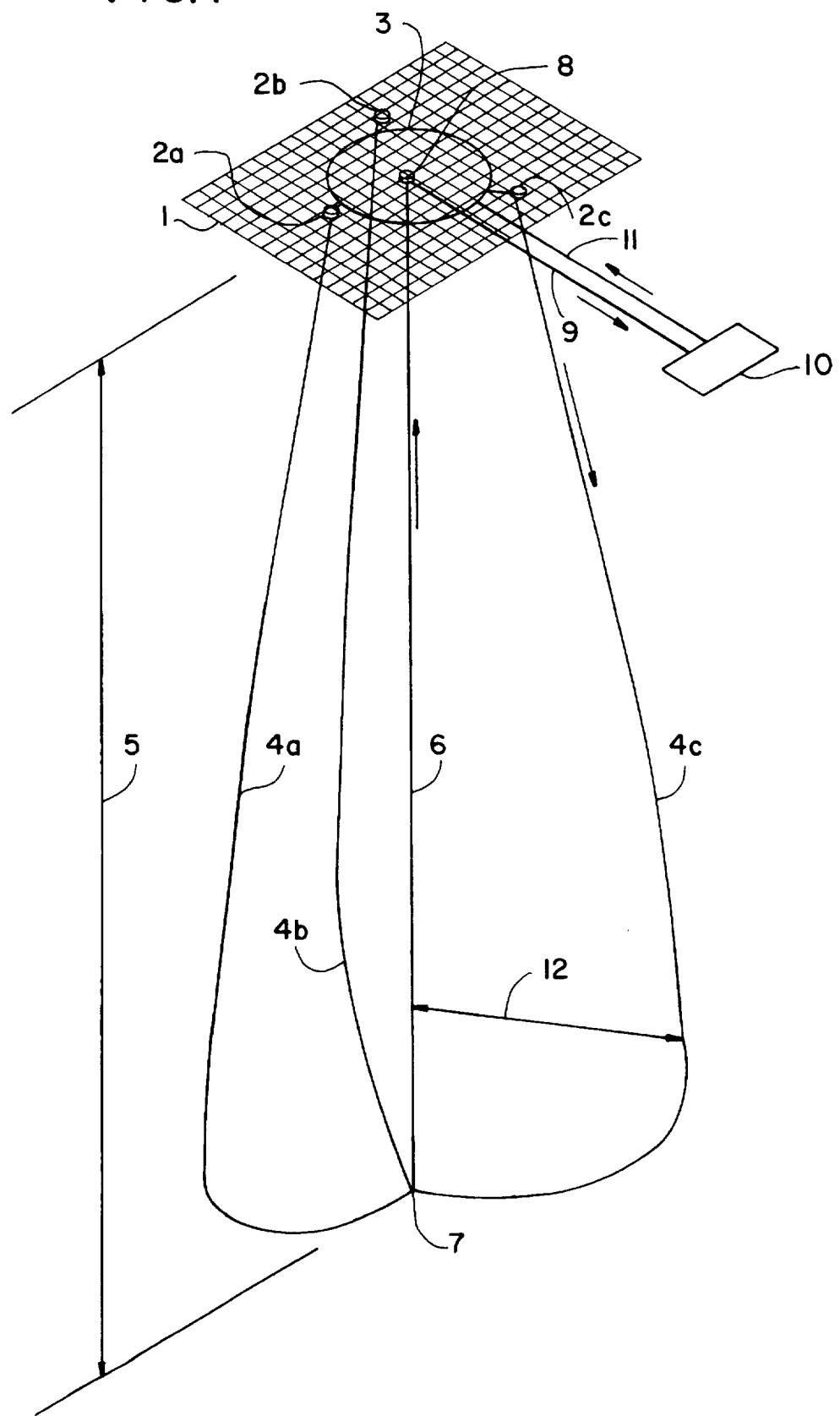
FIG. 1 is a schematic flow diagram of the invention illustrating its principal elements and their relationship in a generalized heat mining system.

The system exemplified by the illustration of FIG. 1 consists of a plurality of injection wells, i.e., downers, and one production well, i.e., riser. A unique advantage of this invention is the large heat source that is made available by a dispersed hot rock area from which thermal energy is gathered and collected into one production well for delivery to the surface for utilization. The production well is drilled directly downward from the surface to a desired depth, e.g., 20,000 feet, and a suitable well casing, e.g., 12 inches diameter, is cemented in place from the surface leaving a space, e.g., about 50 feet, up from the bottom. This space is used as a target into which the injection wells are drilled.

In this illustrative embodiment, three injection wells, located circumferentially a distance from the production well at the surface, are drilled directionally outward to an intermediate depth, e.g., 12,000 feet, and then continued directionally inward to intercept the said space at the bottom of the production well. The injection wells have a casing, e.g., 8.5 inches diameter, tempted in place to said space to allow for a closed continuous flow of liquid from the pipe loops into the riser. As the heat in a hot rock area around an injection well is drawn down, that injection well may be shut down for a period of time, or cycled, to allow that rock area to recover heat by conduction from adjacent hot rock. During this period, at least one of the other injection wells continue supplying the heated liquid flow to the riser which in turn delivers the hot liquid to the surface. The ability of the injection wells to recharge with heat over time determines the number of injection wells required for sustained and continuous power production at a particular location, depth and geothermal gradient.

In the system exemplified in the illustrative embodiment of FIG. 1, three injection wells, e.g., heat conductive pipe loops, 4a, 4b and 4c, are connected to manifold 3 on the earth's surface 1 via valves 2a, 2b and 2c, respectively, and extend down into the earth through subterranean hot rock (not shown) to depth 5, e.g., about 20,000 feet or approximately four miles. In this embodiment, said pipe loops are radially disposed a horizontal distance 12, e.g., in the range of 500 to 1,000 feet, from a centrally located production well, e.g., insulated riser 6, which extends vertically down from the surface 1 to depth 5. The bottom ends of each of the pipe loops 4a, 4b and 4c are connected at 7 to the bottom of riser 6. At the surface, riser 6 is connected via throttle valve 8 to conduit 9 which is connected to the means 10, e.g., having a turbine or heat exchanger, for utilization of the thermal energy recovered from the hot rock. Said means 10 is in turn connected via conduit 11 to manifold 3.

In operation of the embodiment illustrated in FIG. 1, a relatively cool liquid, from 11 is delivered to manifold 3 and passed via one or more of valves 2a, 2b and 2c into injection wells 4a, 4b and 4c, respectively, which extend down to said desired depth, e.g., 20,000 feet, through the subterranean hot rock. As the liquid descends the pipe loop it's temperature progressively increases to a maximum at the bottom. The actual temperature reached by the liquid depends upon its flow rate, the thermal conductivity of the pipe mails and other characteristics of the liquid and of the physical environment within and ouside of the pipe. The individual injection molls may be cycled in rotation depending on the thermal drawdown and renewal of the temperature of the hot rock around the pipe loop. Based on a geothermal gradient of 90° C./km, the temperature of the hot rock at a depth of 20,000 feet would be about 548° C. before thermal drawdown. The flow of heated liquid from the pipe loops passes into the bottom of riser 6 and ascends to the surface. Since the density of the hotter fluid in riser 6 is lower than the density of the colder fluid in the pipe loops 4a, 4b and 4c, gravity causes a thermo-syphon to be created whereby the fluids in riser 6 flow upward to the surface and the fluids in the pipe loops flow downward without need for auxiliary pumping. Depending on the pressure maintained at the top of riser 6, as controlled by throttle valve 8, same of the liquid in riser 6 can be allowed to flash to vapor thereby further decreasing the average density of the fluids in the riser and enhancing the thermo-syphon effect. The flow from the riser, at the pressure controlled by throttle valve 8, is delivered for utilization to means 10, inhere it may be heat exchanged for use in space heating, process heat, vapor (e.g., steam) generation or other purpose and/or it may be separated into liquid and vapor and the vapor passed through a turbine and condensed for production of electricity. The resulting liquids from such utilization are returned via conduit 11 to manifold 3 for recycling via said pipe loops to recover additional thermal energy from the hot rock.

Figure 2:
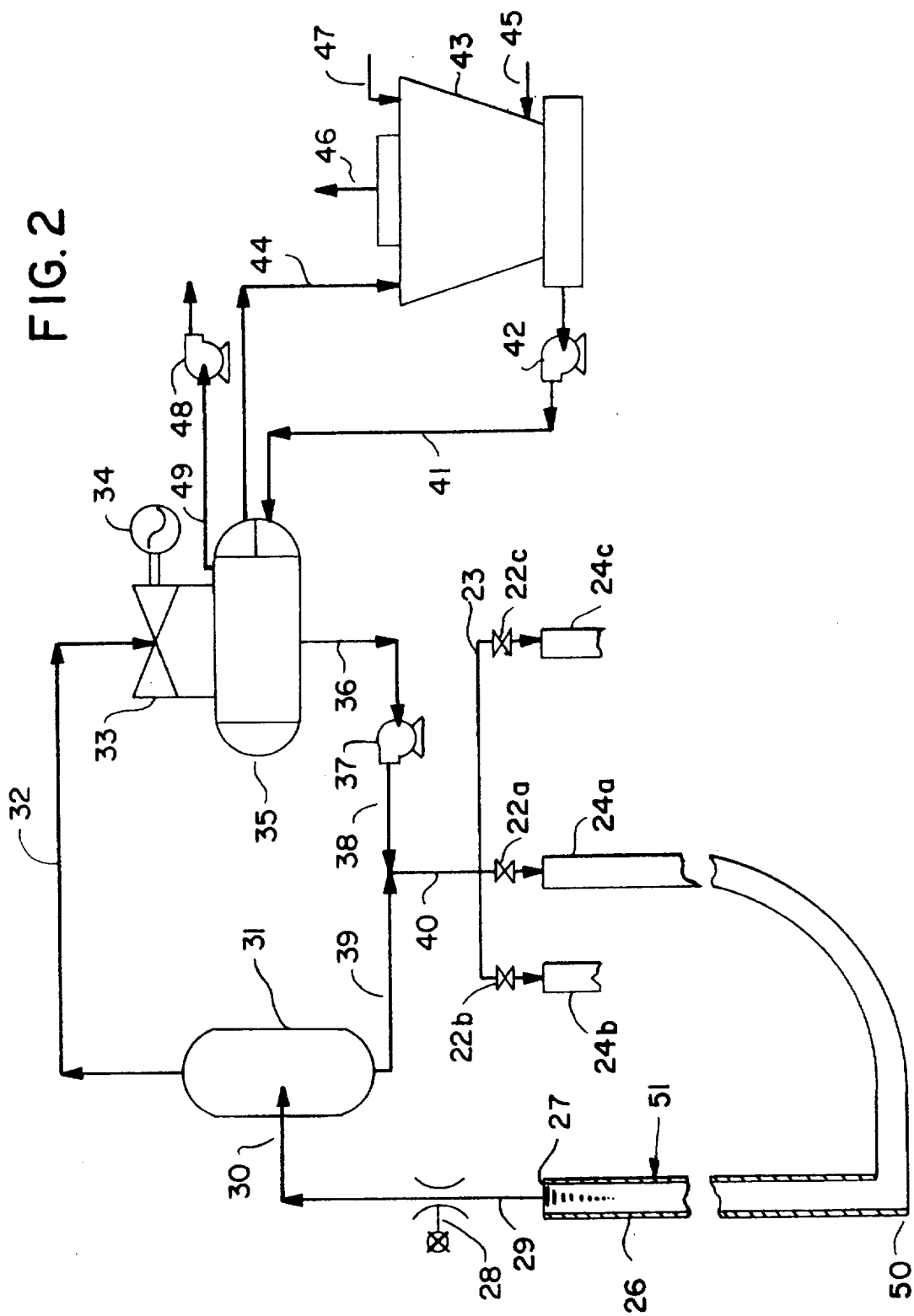
FIG. 2 is a schematic flow diagram of an embodiment of the invention for a heat mining electric power plant. The illustrated system, operating at the conditions described hereinafter, would generate about eleven megawatts of electricity utilizing the thermal energy recovered from subterranean hot rock to a depth of approximately four miles below the earth's surface having a geothermal temperature gradient of 90° C./km.

The embodiment schematically illustrated in flow diagram FIG. 2, describes a system designed to recover thermal energy from subterranean hot rock and to produce 11,000 kilowatts of electricity utilizing water as the operating fluid. In this embodiment, as in the embodiment of FIG. 1, the descending pipe loops are heat conductive, the production riser is insulated, and the bottoms of the pipe loops and riser are connected at a depth of about 20,000 feet. At this depth, based on a geothermal gradient of 90° C./km, the hot rock would have a temperature of 548° C. or 1018° F. The rock heated downer 24a, extending from downer wellhead 25a and valve 22a, illustrates one pipe loop of a plurality of pipe loops that are connected to manifold 23 at the earth's surface. Production well riser 26 is a single pipe, insulated and vertically disposed, connected at its bottom end 50 to said plurality of pipe loops, e.g., at a depth of about 20,000 feet. The cross-sectional area of riser 26 is made sufficiently large to accomodate the liquid flows from said plurality of pipe loops and flashed vapor formed in the riser. The upper section of the riser may have a greater diameter than its lower section to offset the increased flow velocity that would result from the increased volume of flashed vapor therein. The top of riser 26 is connected by conduit 29 from riser wellhead 27 to variable throttle 28 and thence by conduit 30 to separator 31 wherein the two-phase flow is separated into liquid and vapor. The separator 31 is connected at or near its top by conduit 32 to turbine 33 of a turbine-generator set which in turn is connected to surface condenser 35 where the vapor from separator 31 is condensed to liquid after having passed through the turbine. Said turbine-generator set comprises turbine 33 mechanically geared to electricity generator 34. Surface condenser 35 is connected via conduit 36, hot well pump 37 and conduit 38 to conduit 40 which in turn is connected to manifold 23. The separator 31 is connected at or near its bottom to conduit 39 which in turn is also connected to conduit 40.

In this illustrative embodiment, surface condenser 35 is cooled with water supplied through pipe 41 by pump 42 from the bottom of cooling tower 43. The heated cooling water from condenser 35 is recycled via conduit 44 to the top of cooling tower 43. Atmospheric air supplied via conduit 45 cools the water in cooling tower 43 and leaves the top of the cooling tower as humid air via 46. Make-up water from an external source supplied to the cooling tower via conduit 47 compensates for the loss of water in the cooling system resulting from humidification of the air. Vacuum pump 44, connected to surf ace condenser 35 via conduit 49, removes noncondensable gases that may accumulate in the circulating system, e.g., from air leakage at turbine seals. Clean make-up water supplied to the circulation (not shown) compensates for pressure system leakage and vacuum pump losses.

In operation of the embodiment illustrated in FIG. 2 to produce 11,000 kilowatts of electricity, a flow of relatively cool water from 40, e.g., 551,250 lb/hr at 237 F., is delivered to manifold 23 at a moderate pressure, e.g., 80 psia, and then passed via at least one of valves 22a, 22b and 22c into the pipe loops of injection wells 24a, 24b and 24c, respectively, which extend from their respective downer wellhead, e.g., 25a, through the earth to a depth of about 20,000 feet in the subterranean hot rock into the bottom of riser 26 at 50. As the water descends in the pipe loop it's temperature progressivly increases to a maximum at the bottom, e.g., 630° F. or 332° C., where it remains in liquid phase under the hydraulic pressure of the liquid head in the pipe loop, e.g., 7,125 psia. The actual maximum temperature attained by the water will depend upon its velocity, the thermal conductivity of the pipe walls and other characteristics of the physical environment around the pipes. The individual injection wells may be cycled in rotation depending on the drawdown and renewal of the temperature of the hot rock around the pipe loop. Based on a geothermal gradient of 90° C./km, the temperature of the hot rock at a depth of 20,000 feet would be about 548° C. or 1018° F. before thermal drawdown. The flow of heated water from the pipe loops ascends to the surface in riser 26. Since the density of the heated fluid in riser 26 is less than the density of the colder fluid in the pipe loops 24a, 24b and 24c, the effect of gravity creates a thermo-syphon or natural pumping action whereby the fluid in riser 26 flows upward to the surface and fluid in the pipe loops flows downward without need for auxiliary pumps and external pumping power.

In this illustrative embodiment, throttle valve 28 maintains the pressure in the top of riser 26 at a desired wellhead pressure, e.g., 870 psia and a temperature of 527° F., which allows flashing of the hot water to steam in riser 26 to begin to occur at a depth of about 4,900 feet, e.g., at level 51, where the hydraulic pressure is about 1,600 psia and the temperature of the water is about 605° F. The amount of water flashing to steam in riser 26 will progressively increase as the two-phase water/steam flow ascends from said depth of 4,900 feet to the surface where pressure is being maintained at said wellhead temperature and pressure, e.g., 527° F. and 870 psia, by throttle valve 28. Throttle valve 28 controls the pressure of the two-phase flow, e.g., 551,250 lbs/hr, discharging from riser 26 to a desired utilization reduced temperature and pressure, e.g., 312° F. and 80 psia, which reduced pressure causes the vapor volume to expand and an additional amount of water to flash to steam, and this expanded two-phase flow containing additional water vapor at the reduced temperature then passes via conduit 30 into separator 31 where its water and steam are separated. The thermo-syphon created by the lower density of the fluids in pipe loops 24a, 24b, 24c and the higher density in riser 26 enables liquid water from separator 31, e.g., 351,250 lbs/hr at 312° F., to flow without auxiliary pumping via conduits 39 and 40 to manifold 23 for recycling to recover additional heat from the hot rock. A pump (not shown) may be provided, e.g., in conduit 39, to supplement the natural flow rate. The steam from separator 31, e.g., 200,000 lbs/hr, saturated and preferably dry, flows via conduit 32 at a slightly lower pressure due to normal conduit pressure losses, e.g., 75 psia, to turbine 33 from which it passes to surface condenser 35 wherein the steam as condensed to liquid water under vacuum conditions, e.g., 2.5 inches of mercury absolute. This condensate, e.g., 200,000 lbs/hr at 105° F., then passes via conduit 36 to pump 37 which pressurizes the water, e.g., to 80 psia, and delivers it via conduits 28 and 30 to manifold 23 for recycling together with the water from separator 31 to recover additional heat from the hot rock. Turbine 33 transfers its mechanical energy to generator 34 which produces electricity, e.g., 11,000 kilowatts. The liquid in conduit 39, before passing to conduit 40, may be subjected to heat exchange (not shown) for heat utilization and/or to flashing at a reduced pressure for use of such vapor in a secondary turbine (not shown) to produce additional power.

While the invention has been described with reference to certain preferred and illustrative embodiments it is not intended to be so limited thereby, and modifications and substitutions of equivalents without exceeding the scope of departing from the spirit of the claimed invention will be apparent to those having ordinary skill in the art and are intended to be covered by the invention claimed herein. Accordingly, it is to be understood that the drawings and descriptions presented herein are merely illustrative and preferred examples in order to facilitate comprehension of the invention and should not be construed to limit the scope thereof which is defined by the claims.

I claim:

1. A method for recovering thermal energy contained in subterranean hot rock, comprising:

a) providing an insulated conduit extending from the surface of the earth to a desired depth in said hot rock;

b) providing a plurality of heat conducting pipes, each of which extends from a manifold at a surface of the earth, through said hot rock and into a bottom of said conduit, thereby forming a closed flow path from said manifold into the bottom of said conduit;

c) heating a fluid in the form of a relatively cool liquid by passing said fluid from said manifold through at least one pipe of said plurality of pipes thereby providing a heated liquid containing thermal energy from said hot rock;

d) passing the heated liquid from said at least one pipe into said bottom of said conduit thereby providing said fluid at a top of said conduit after rising through said conduit;

e) discharging said fluid from said top of said conduit;

f) maintaining a desired wellhead pressure of the fluid in the top of said conduit;

g) maintaining a desired reduced pressure of the fluid being discharged from said conduit;

h) extracting thermal energy from said fluid after being discharged from said conduit thereby cooling said fluid and providing said relatively cool liquid; and i) recirculating fluid from step "h" depleted in thermal energy to provide the relatively cool liquid in step "c".

2. A method according to claim 1 wherein said liquid is vaporizable, further comprising:

j) maintaining said wellhead pressure to cause a portion of the heated liquid in said conduit to vaporize and form a hot two-phase flow of liquid and vapor as it ascends in said conduit.

3. A method according to claim 2, further comprising:

k) separating the liquid and vapor of said two-phase flow being discharged from said conduit.

4. A method according to claim 3, further comprising:

expanding said vapor in a turbine and condensing said expanded vapor at a further reduced pressure, thereby producing power and relatively cold liquid condensate.

5. A method according to claim 4, therein said separated liquid and condensate provide the cool liquid in step "i".

6. A method according to claim 1, wherein said thermal energy is extracted by heat exchange.

7. A method according to claim 2, which further comprises:

k) transferring heat from liquid in step "h" by heat exchange to another fluid.

8. A method according to claim 1, wherein said liquid is water.

9. A method according to claim 4, wherein said liquid is water and said vapor is steam.

10. A method according to claim 1, further comprising:

j) maintaining the liquid in at least one of said pipes of said plurality essentially immobile; and k) continuously extracting thermal energy in step "h".

11. A method according to claim 1, wherein said liquid is an organic substance.

12. A method according to claim 1, wherein said liquid has a boiling point higher than that of water and is chemically stable in said flow path.

13. A method according to claim 1, wherein said liquid has a boiling point loner than that of water and is chemically stable in said flow path.

14. A method according to claim 13, wherein said liquid is selected from the class of substances consisting of ammonia, aqueous ammonia, isobutane, isopentane and fluorocarbon refrigerants.

15. A method according to claim 1, wherein said insulated conduit extends to a depth in the range of 5,000 to 50,000 feet.

16. A method according to claim 1, wherein said reduced discharge pressure is in the range of 50 to 750 psia.

17. A method according to claim 1, wherein said hot rock is at a temperature in the range of 300° C. to 1000° C.

18. A method for utilizing thermal energy contained in subterranean hot rock, comprising:

a) providing an insulated conduit extending vertically from the surface of the earth into said hot rock;

b) providing a plurality of heat conducting pipes, each of which is disposed radially from said conduit and extends from a manifold at a surface of the earth through said hot rock and into a bottom of said conduit thereby forming a closed flow path from said manifold into the bottom of said conduit;

c) heating a relatively cool liquid by passing said liquid through at least one pipe of said plurality of pipes thereby providing heated liquid containing thermal energy from said hot rock;

d) passing the heated liquid from said at least one pipe into said bottom of said conduit;

e) maintaining the wellhead pressure in the top of said conduit to cause a portion of the heated liquid in said conduit to vaporize and form a hot two-phase flow of liquid and vapor as it ascends in said conduit;

f) discharging said two-phase flow from said top of said conduit;

g) maintaining a desired reduced pressure of the two-phase flow being discharged from said conduit thereby increasing the vapor content in said flow;

h) utilizing thermal energy contained in said two-phase flow after being discharged and condensing the vapor in said flow to liquid condensate, thereby cooling said flow and providing cooled liquid; and i) recirculating said cooled liquid from step "h" to provide the relatively cool liquid in step "c".

19. A method according to claim 18, further comprising, in step "h":

i) separating said liquid and vapor being discharged from said conduit in step "f"; and k) expanding said separated vapor in a turbine to produce power; and l) condensing said expanded vapor.

20. A method according to claim 18, wherein no subterranean environmental pollutants are released to the environment.

21. Apparatus for recovering thermal energy contained in subterranean hot rock, comprising:

a) an insulated conduit extending from a wellhead at the surface of the earth to a desired depth in said hot rock for passing a fluid in said conduit from said depth to said wellhead;

b) a plurality of heat conducting pipes, each of which is connected at a top end through a valve to a manifold at the surface of the earth and at the other end to a bottom of said conduit forming a closed flow path from said manifold into said conduit;

c) means connected to said manifold for supplying liquid at a relatively cool temperature to said manifold;

d) throttling means connected to a top of said conduit for maintaining a desired wellhead pressure in said conduit and for maintaining a desired discharge pressure of the fluid being discharged from said throttling means;

e) means connected to said throttling means for receiving said discharged fluid and for extracting thermal energy therefrom and providing said liquid at said relatively cool temperature; and f) means connected to the means for supplying liquid for recirculating liquid at said relatively cool temperature from the means for receiving said discharge fluid to said manifold.

22. Apparatus according to claim 21, wherein said insulated conduit extends to a depth in the range of 5,000 to 50,000 feet.

23. Apparatus according to claim 21, wherein said discharge pressure is in the range of 50 to 750 psia.

24. Apparatus according to claim 21, wherein the temperature of said hot rock is in the range of 300° C. to 1000° C.

25. Apparatus for utilizing thermal energy contained in subterranean hot rock, comprising:

a) an insulated riser for passing fluid from a desired depth in said hot rock to the surface of the earth;

b) a plurality of heat conducting pipes, each of which extends from the surface of the earth to said depth and is disposed outward from the top of said riser to a desired distance from said riser and then inward to join a bottom of said riser thereby forming a closed flow path from each of said pipes into the bottom of said riser;

c) a manifold at said surface to which each of said pipes is connected through a valve;

d) means connected to said manifold for supplying liquid at a relatively cool temperature to said manifold, said liquid being capable of existing in vapor phase at elevated temperature;

e) means for passing liquid from said manifold to at least one of said pipes;

f) throttling means connected to a top of said riser for maintaining a two-phase flow of liquid and vapor discharging from said riser at a desired pressure;

g) means connected to said throttling means for receiving said two-phase flow and for extracting thermal energy therefrom and for providing said liquid at said relatively cool temperature; and h) means connected to said manifold for recirculating liquid at said relatively cool temperature from the means for receiving said discharge fluid to said manifold.

26. Apparatus according to claim 25, wherein said plurality of pipes is disposed radially around said riser.

27. Apparatus according to claim 25, wherein the internal cross-section area of the upper part of said conduit is greater than the internal cross-section area of the lower part of said conduit.

28. Apparatus according to claim 25, which further comprising in the means for receiving said two-phase flow:

i) separator means for separating said two-phase flow into liquid and vapor flows;

j) turbine-generator means for expanding said separated vapor and generating electricity;

k) surface condenser means for condensing said expanded vapor to liquid at a relatively low temperature and pressure; and l) pump means for pressurizing said condensed liquid.

29. Apparatus according to claim 27, wherein said liquid in the means "d" is water.

30. A method according to claim 4, which further comprises:

m) utilizing power produced by said turbine to drive a generator and produce electricity.

31. A method according to claim 12, wherein said liquid is selected from the class of fluids which are conventionally known as heat transfer fluids.

32. A method according to claim 19, which further comprises:

m) utilizing power produced by said turbine to drive a generator and produce electricity.

* * * * *

UNITED STATES PATENT AND TRADEMARK OFFICE
CERTIFICATE OF CORRECTION

PATENT NO. : 5,515,679
DATED : May 14, 1996
INVENTOR(S) : Gary Shulman

It is certified that error appears in the above—identified patent and that said Letters Patent is hereby corrected as shown below:

In Column 2, line 7, for "mineral s" read --minerals--; and line 59, for "delivery" read --recovery--, and for "there" read --where--; and line 65, for "thermal-syphon" read --thermo-syphon--. In Column 4, line 36, for "OF THE" read -- OF--; and line 58, for "tempted" read --cemented--. In Column 5, line 22, for "liquid," read --liquid--; and line 29, for "mails" read --walls--; and line 32, for "molls" read --wells--; and line 45, for "same" read --some--; and line 50, for "inhere" read --where--. In Column 6, line 37, for "surf ace" read --surface--. In Column 7, line 37, for "as" read --is--; and line 54, for "of" read --or--. In Column 8, line 36, for "expanding" read -- 1) expanding--; and line 39, for "therein" read --wherein--; and line 62, for "loner" read --lower--. In Column 9, line 41, for " i) " read -- j) --. In Column 10, line 55, delete "which"; and line 67, delete "in the means "d" ".

Signed and Sealed this

Twelfth Day of November, 1996

Attest:

BRUCE LEHMAN

*Attesting Officer*   *Commissioner of Patents and Trademarks*